Figure 1:
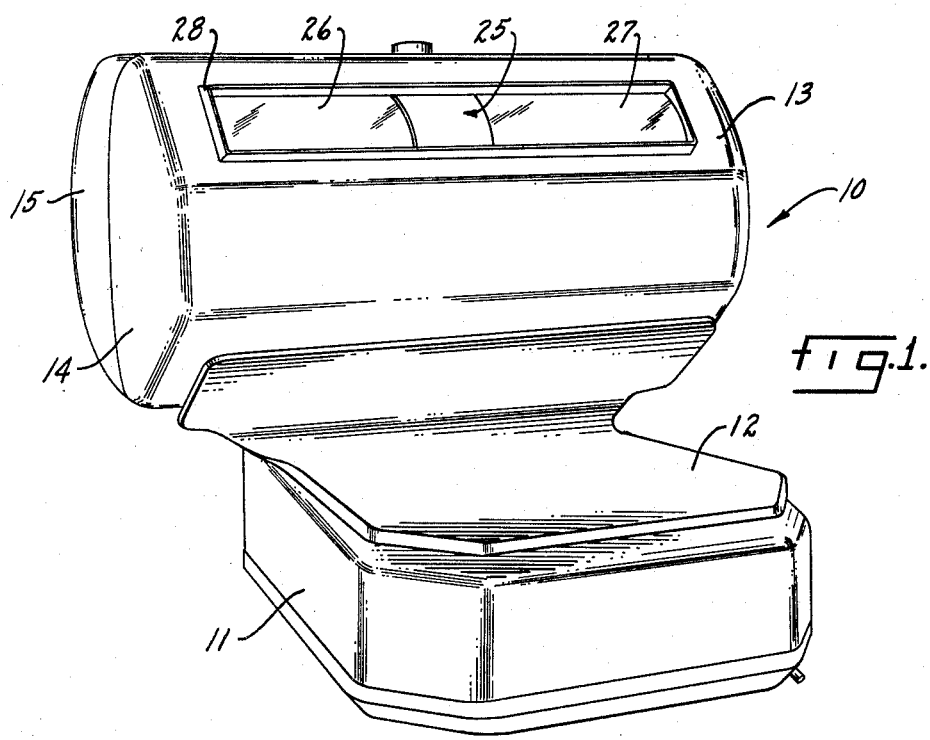

Oct. 8, 1963

E. C. KARP 3,106,186

INDICATING DEVICE INDEX

Filed June 5, 1961

2 Sheets-Sheet 1

INVENTOR.
Edward C. Karp,
BY
Byron, Hume, Groen & Clement
Attorneys.

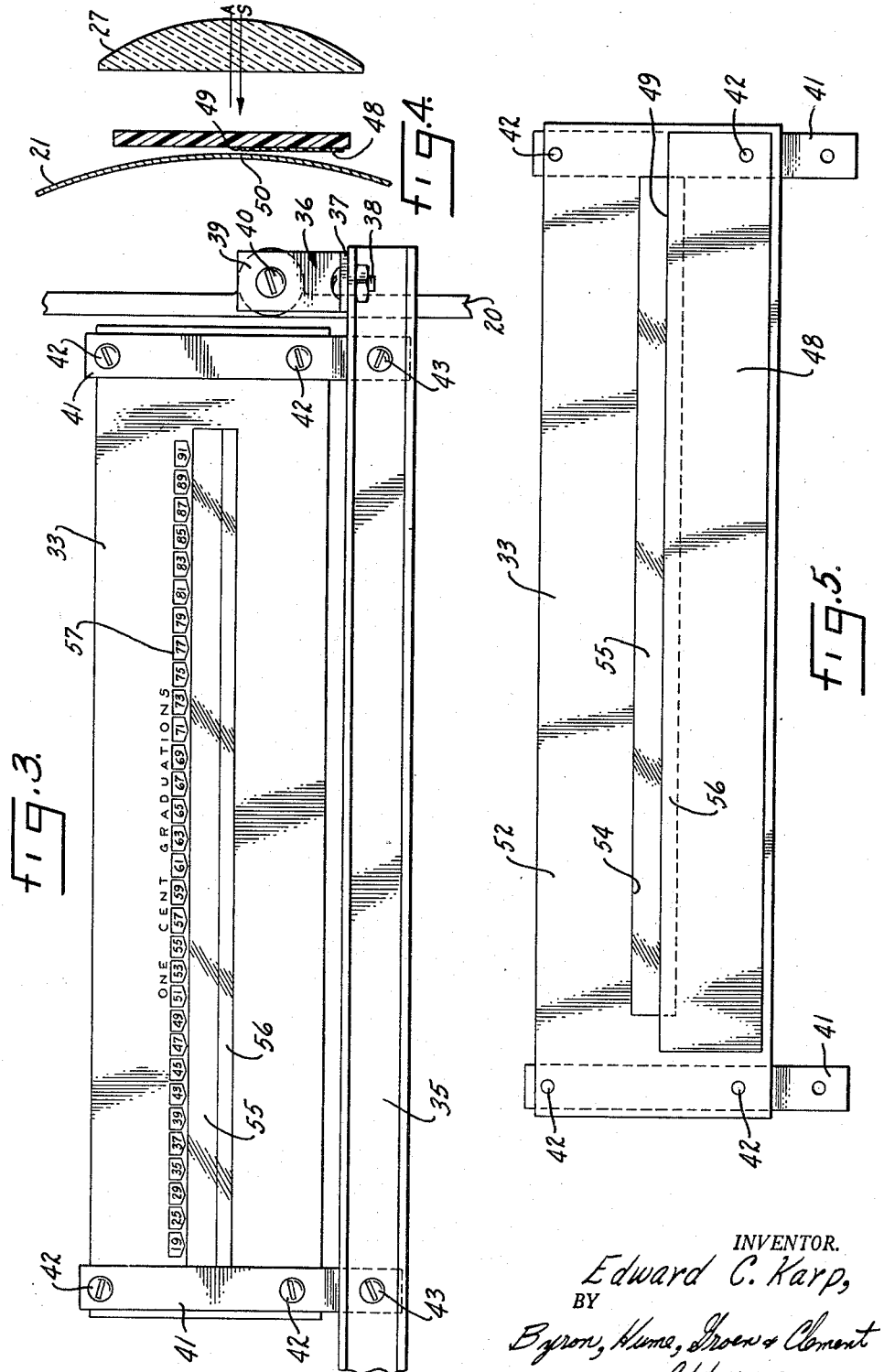

3,106,186
INDICATING DEVICE INDEX
Edward C. Karp, Belvidere, Ill., assignor to Sanitary Scale Company, Belvidere, Ill., a corporation of Illinois
Filed June 5, 1961, Ser. No. 114,886
3 Claims. (Cl. 116—129)

This invention relates in general to apparatus for reading indicating devices and more particularly to indexing means therefor. It deals specifically with a new and improved index assembly for reading weighing scales or the like.

To facilitate reading indicating devices such as weighing scales or testing devices, for example, it is common practice to provide an index line in one form or another to establish a zero or base reference point. In other words some reference line must be provided which, when properly viewed in association with the indicia carrying chart of an indicating device, will indicate a correct value; weight in the case of a weighing scale.

To simplify the understanding of the present invention the index assembly thereof is discussed herein in relation to a weighing scale. Although the discussion is so referenced it will be clear from the following description that the principles are equally applicable to other indicating devices requiring an index reference.

The obvious general standard for indexing means on a weighing scale and subscribed to by anyone reading a scale is "intelligibility." The intelligibility of an index line, for example, in relation to scale graduations must be such as to facilitate rapid and accurate reading of the correct value indicated. Precise definition of the index line, legibility of the chart in relation to the index line and readability of the index line and chart combination to provide the correct indicated value might collectively be considered the basis for intelligibility.

The various States of the United States have adopted certain standards to insure "intelligibility" of weighing scale charts and associated index lines in order to protect their purchasing citizenry from the errors that might result from freely interpreted indices. These standards are, on the whole, adopted directly from "Specification, Tolerances, and Regulations for Commercial Weighing and Measuring Devices" adopted by the National Conference on Weights and Measures and as published by the National Bureau of Standards.

Until recently the Bureau of Standards prescribed, as set out in their handbook H–44, second edition, 1955, "Specification, Tolerances and Regulations for Commercial Weighing and Measuring Devices," the provisions of which are closely followed in the regulations of most states, a minimum index line thickness of 0.008 inch. The requirement was effected by general specification G–S.5.1.3.—Width, which provided that "graduations shall in no case be less than 0.008 inch in width," in conjunction with G–S.5.3.3.—Width, which provided that the "width of the index . . . be . . . not less than the width of the narrowest graduation." This code was the result of a determination that graduation lines of less than 0.008 inch in thickness were not readily perceived by the average reader. Accordingly, for a conventional index line establishing medium, a minimum thickness of 0.008 inch was deemed necessary to insure its definition in the eyes of the reader.

The use of an index line (usually a wire or ribbon) and graduation lines of this specified thickness results in the unavoidable "blockout" and obscuring of graduation lines and associated numerals as well as the possible confusion of value or weight numerals. To be more precise, a graduation line is sometimes completely hidden behind an index line of this thickness and in many instances this may lead to a confusion as to where the index line begins and the graduation ends. Numerals such as zero and eight may be confused by a bi-secting index line. Even numerals one and seven may sometimes be confused when immediately adjacent to and impinging on a conventional index line. Utilizing a wire of this thickness it has been computed that blockout in reading a conventional 24 pound scale, for example, might effect an uncertainty in a value reading in the neighborhood of 1½ cents on a $1.50 reading. Thus, it is easy to anticipate a possible error in the neighborhood of approximately 1% of a grocer's commodity sales through the use of index devices incorporating index lines and graduations according to this standard.

In 1958 the requirements which conjunctively set the standard for minimum index line thickness at 0.008 inch were modified by unanimous action of the National Conference on Weights and Measures. The code set out in the aforementioned handbook, H–44, was amended at that time to effectively eliminate any recitation of a required minimum indicia width. Regardless of this modification of the code, the unwritten standard of "intelligibility" remained unchanged and indices of various types continued to be of appreciable finite width, in the neighborhood of 0.008 inch for example, to afford intelligibility. As a result, the problem of "blockout" and the obscuring of graduation lines by a conventional index wire, for example, continued as prominent as ever. In other words, though a standard code provision which might have stifled the development of a highly intelligible, non-blockout index means was eliminated, no ready answer to the problem was forthcoming.

Accordingly, it is an object of this invention to provide a new and improved index assembly affording superior intelligibility in the direct reading of the indicia carrying chart of an indicating device.

Still another object is to provide an index assembly which substantially eliminates blockout of chart graduations by an index line, partial obscuring of the graduations and numerals or confusion between the two in reading the chart with a consequent elimination of error in the direct reading of the indicia carrying chart of an indicating device.

Yet another object is to provide greater intelligibility in reading an indicia carrying chart by means of an index line established through color definition.

Another object is to provide an index assembly which tends to cause the reader to concentrate on the portion of an indicia carrying chart having numerically lower valued graduations thereon, the higher valued graduations being visible for reference but less prominent.

Yet another object is to provide an index assembly having a relatively wider viewing area over the portion of an indicia carrying chart having the numerically lower valued graduations thereon to facilitate emphasis of this portion of the chart.

Another object is to provide an index assembly including a magnifying lens having its optical axis positioned to draw the reader's attention into that portion of the indicia carrying chart having the numerically lower valued graduations thereon.

A further object is to provide an index assembly which is simple and inexpensive in construction, yet consistently affords more accurate value readings than similar index means heretofore known.

The above and other objects are realized in accordance with the present invention by providing a new and improved index assembly for a weighing scale. As has been pointed out above, however, it will be understood that index assemblies embodying this invention might be utilized as well with various other indicating devices. The illustrations and descriptions of a weighing scale throughout this application are exemplary only.

Briefly, the invention contemplates establishing an index line or demarcation edge through the office of a line of contrast between adjoining portions of a transparent medium having contrasting color means associated therewith. This effect is preferably provided through the use of a sheet of clearly transparent material, such as glass or plastic, for example, the lower portion of which has applied thereto a tinting material. Obviously, less light is transmitted transversely through the sheet of transparent material in the area of the tinting material and a line of contrast is defined. The line is not a line as such, but to the viewer is usually realized as a demarcation edge between two adjacent viewing portions of different relative transparency.

Figure 2:
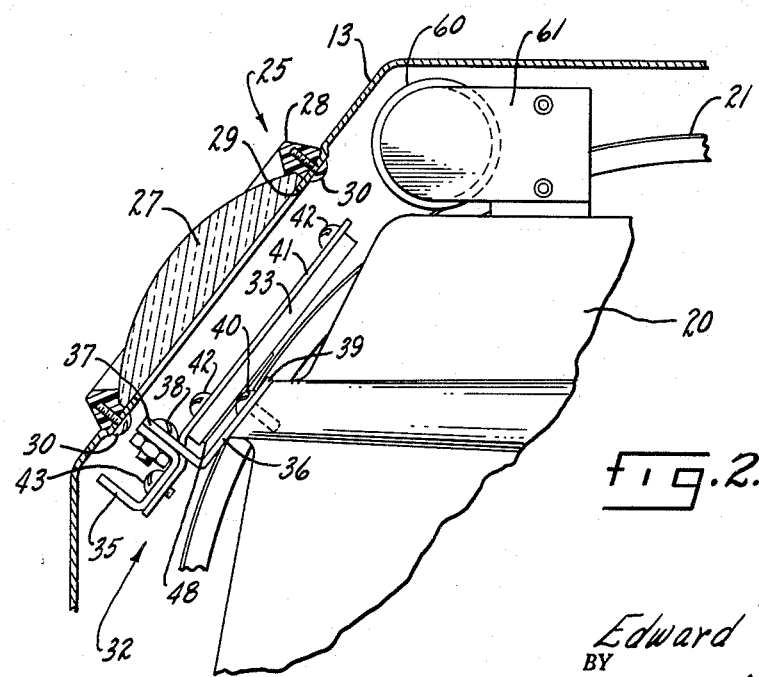

The invention both as to its organization and method of operation taken with further objects and advantages thereof, will best be understood by reference to the following description taken in connection with the accompanying drawings:

FIGURE 1 is a perspective view of a weighing scale including an index assembly embodying this invention, FIGURE 2 is an enlarged end view in partial section of the weighing scale and index assembly shown in FIGURE 1, with parts broken away, FIGURE 3 is a front elevational view of a portion of an index assembly embodying this invention, with parts broken away, FIGURE 4 is a diagrammatic side view of portions of a weighing scale and an index assembly embodying this invention, in operative relationship; and FIGURE 5 is a rear elevational view of a portion of the index assembly defining an index line.

Referring to the drawings and particularly to FIGURE 1, a weighing scale is shown generally at 10. The scale 10 includes a somewhat rectangular base portion 11 which encloses a weighing mechanism of well known construction (not shown) supporting a weighing tray 12. A generally cylindrical housing 13, here shown to be octagonal in cross section and composed of a front section 14 and a back section 15, extends upwardly from the rear of base 11.

Referring now to FIGURE 2, the housing 13 encloses a supporting framework, a portion of which is shown at 20. The framework is conventional in construction and, in detail, forms no part of this invention. A rotatable drum chart 21, also of well known construction, is suitably carried for rotation within the housing 13 upon the framework 20. The drum chart 21 carries indicia in the form of numbered graduation lines on its face and is connected in a well known manner to the mechanism which supports the weighing tray 12.

A rectilinear lens assembly 25 is shown mounted on the upwardly inclined face of the front section 14 of the housing 13. In the particular arrangement as shown in FIGURE 1 the lens assembly includes a pair of planoconvex lenses 26 and 27 covered by an appropriately shaped framework 28 which might be composed of Bakelite, for example. The lens assembly is secured to the front section 14 over viewing aperture 29 by screws 30.

Intermediate the lens assembly 25 and the drum chart 21 is the index assembly 32. The index assembly 32 is closely spaced from the drum chart 21 in the optical system of the lens assembly 25 and supported from the framework 20. It includes a sheet 33 of highly transparent material, the transparency of which is modified in certain portions. Actually the assembly 32 utilizes a sheet 33 associated with each of the lenses 26 and 27, but only one is shown and described herein. The sheet 33 shown, which is representative of both sheets, is a relatively thick sheet of clear transparent plastic.

The index assembly 32 includes a horizontally extending channel member 35 supported from the framework 20 within the housing 13 by L-shaped brackets 36. The foot 37 of each L-shaped bracket is secured to channel member 35 by a conventional fastening screw 38 and the leg 39 of each L-shaped bracket 36 is likewise secured to framework 20 by a fastening screw 40.

Each of the clearly transparent sheets 33, which might be referred to as index members, are mounted on top of channel member 35 on brackets 41 secured to the sheets by screws 42 and to the channel members 35 by screws 43. This is best seen in FIGURE 3. Each sheet is preferably composed of an acrylic plastic, but it is conceivable that virtually any transparent material such as glass or the like might be utilized. In addition, though the sheets are shown to be generally planar or flat, it is conceivable that they might be curved to match the curvature of the drum chart or otherwise formed, for example. Each sheet is approximately one-eighth of an inch thick, although the thickness is not critical and could vary substantially within limits.

As has been pointed out, each sheet 33 of plastic is preferably clearly transparent. Referring now to FIGURES 4 and 5, a thin strip of transparent plastic tape 48, which might be of the adhesive type, is secured to the lower half of the rearmost surface of each sheet in such a manner that one edge 49 extends longitudinally of the sheet substantially mid-way between its upper and lower edges. The transparent tape 48 might be Du Pont Mylar tinted blue or green, for example. As a result, the edge 49 of the tape describes a demarcation edge between contrastingly tinted portions of each sheet 33, as viewed from the front thereof. In effect, more light reflecting off the chart 21 is transmitted through the untinted upper portion of each index member 33 than through the tinted lower portion thereof and this phenomena establishes the index line.

An opaque background 52 might be applied to the rearmost side of each plastic sheet 33, as best seen in FIGURE 3. Each background 52 could be painted on a sheet by silk screening or any other well known process or it might be a decal, for example. A strip 54 is omitted from its center and extends longitudinally along its length. The cut out defines the reading area bracketing the demarcation edge or index line 49. The background might be colored black, for example, although the color is but a matter of choice. The reading area defined by the strip 54 is divided into a wide upper section 55 and a narrower lower section 56 by index line 49. In practice the upper section is approximately twice the width of the lower section. The ramifications of this relationship will be hereinafter explained.

Extending along the upper edge of the strip 54 is a set of indicia 57 establishing whether one or two cent graduations are used in the associated chart columns and indicating price per pound for any given chart column. The use of two cent graduation indicators in this manner is generally conventional, of course, and it is conceivable that other means of defining the value of graduations and price per pound might be utilized. It should be noted, however, that no graduation indicators are utilized along the lower edge of the reading area defined by the strip 54, though these might be used.

It will be noticed, of course, that only one plastic sheet or index member 33 is shown and described in detail. As has previously been pointed out, each of the sheets is substantially identical, with the exception of specific price and value indicia. At any rate, it is not thought necessary to show and describe both sheets 33 in detail.

An elongated fluorescent bulb 60 for illuminating the indicia carrying drum chart 21 is best seen in FIGURE 2. The bulb 60 might be supported by brackets 61 (only one of which is shown) carried by the framework 20. In addition to lighting the indicia carrying drum chart 21, the bulb 60 illuminates each of the plastic sheets or index members 33 and might even provide edge lighting for the sheets in a well known manner.

FIGURE 5 diagrammatically illustrates the relative positioning of the magnifying lens 27, a plastic sheet or index member 33 and the drum chart 21. It will be seen that the edge 49 of colored transparent tape 48 is very close to the scale face. The handbook of the United States Bureau of Standards requires that the index line be no more than 0.060 inch from the scale under unmagnified conditions in weighing scales of this type. For a lens having a magnification of approximately 2.00, the maximum distance is proportionately reduced to only 0.030 inch. However, it will be understood that under different circumstances, using lenses of varying magnifying powers, the plastic sheet 33 might be established at varying distances less than 0.060 inch from the face of the chart.

The immediately aforedescribed maximum distance limitations were generally established to guard against the introduction of substantial parallax error in the reading of weighing scales. The farther the actual index line departs the surface of an indicia carrying chart, for example, the greater the parallax error in value reading if the reader's eyes depart the so called correct reading plane for the index assembly. As will be readily seen, it is a simple matter, with the index assembly embodying this invention, to establish the index line very close to the chart surface and well within the maximum permitted range, thereby minimizing any parallax error.

It will be seen that in viewing chart 21 through lens 27 and an index member 33, the proper reading plane or line of sight S is that plane generally normal to the surface of chart 21 and passing through the demarcation edge or index line 49. The zero point of the scale is established such that the valued graduation on the drum chart which is the correct graduation for the item being weighed will be indicated at 50, along a line also lying in the aforedescribed plane and the proper line of sight S.

The optical axis A of the magnifying lens 27 lies above the aforedescribed reading plane and the demarcation edge or index line 49. It preferably extends approximately through the middle of the wider upper section 55 of the reading area on each index member 33. In practice, the effect of this relative positioning is to draw the reader's eyes, as he makes his reading on the proper plane S, into the wider untinted section 55 of the reading area. In other words, in addition to that effect whereby the reader is induced to look into the portion of the chart having relatively lower numerical values because these lower values lie under the untinted portion of an index member, the positioning of the optical axis A of the magnifying lens 27 also aids in drawing the reader's attention to this area. Furthermore, the very size of the wider section 55 of the reading area overlying these lower numbered graduations is attention drawing. Immediately above the reading area, of course, are the price indicators 57 which, with merely a glance by the reader, readily tell the butcher, or groceryman, for example, the total price for the item.

The index assembly embodying this invention establishes an index line or demarcation edge which is sharp and extremely well defined and yet is of substantially zero width. Because the line is transparent and non-obstructive there is no confusion between the index line and the graduation lines nor are any such graduation lines blocked out. Nevertheless, the index line is extraordinarily prominent to the visual senses of the reader.

Because of the darker tinted effect of the lower portion of each index member 33 the eyes of the reader are immediately drawn to the portion of the indicia carrying drum chart in the area above the index line. Consequently, it is easy for the reader to add the pertinent numbered graduations to the next lower numbered graduation to get the proper weight, in this instance, for example. Without this specific arrangement of the upper and lower, lighter and darker tinted portions, respectively, the reader might be tempted to read in the zone of the higher numbered graduations where difficulties are frequently encountered in calculating the correct value reading from its relationship to the next higher numbered graduation.

Since the reading area is divided into upper and lower sections, and the upper section is substantially wider than the lower, additional emphasis is placed on reading the portion of the indicia carrying drum chart which carries the relatively lower numbered graduations. The fact that the optical axis of the magnifying lens is generally centered in the wider upper section of the reading area aids in drawing the reader's eyes to this section. At all times, however, the indicia below the index line in the narrower section, which is tinted a darker color than that section above the line, are readily seen for reference.

Since each sheet of plastic 33 extends both above and below the index line, in fact covering the whole reading area, no optical aberrations are introduced from a reader being forced to look through one type of medium above the line and another below it, as might be the case where the edge of a single transparent member is utilized to define an index line. In conjunction with this, of course, the index members in this invention provide reflection free demarcation edges unlike the aforedescribed single member index assembly, for example, which inherently introduces reflection problems on its index line defining edge.

This index assembly conforms to the standards recommended by the National Bureau of Standards and approved by the National Conference on Weights and Measures. As has been demonstrated, when used in any capacity, an index assembly embodying this invention is productive of highly intelligible and consistently accurate readings.

Although an index member forming an essential component of this invention has been described in terms of a plastic sheet, it should be understood that it might take other forms within the scope of the invention. For example, it is conceivable that a tape or film alone having color contrast characteristics embodied therein might be utilized in its stead. Of course, it is intended to cover in the appended claims all such embodiments of the invention, modifications or improvements thereon, as fall within the true spirit and scope of the invention.

What is desired to be claimed and secured by Letters Patent of the United States is:

1. In combination in an indicating device, an indicia carrying chart including a series of graduations of increasing value, a transparent index member overlying said chart in close proximity thereto, said member including means establishing an index line, means defining a reading area bracketing said index line, a wider section of said reading area lying on one side of said index line than on the other side of said index line, said wider section of reading area overlying the relatively lower valued graduations in said series so that a reader's eyes are drawn to said lower valued graduations, a magnifying lens overlying said member, the optical axis of said magnifying lens extending generally through the center of said wider section of reading area.

2. In combination in an indicating device, an indicia carrying chart including a series of graduations of increasing value, a transparent index member overlying said chart in close proximity thereto, a sheet of transparent material covering one portion of the surface of said member adjacent said indicia carrying chart, said sheet being tinted darker than said transparent index member, the edge of said sheet establishing a demarcation edge when the chart is viewed through said member, said demarcation edge defining an index line for reading the correct value on said chart, an opaque background defining a reading area bracketing said index line, a wider section of said reading area lying on one side of said line, said darker tinted one portion overlying the relatively higher value graduations in said series so that a reader's eyes are drawn to the relatively lower value graduations, said relatively lower value graduations lying under said wider section of reading area.

3. The index assembly of claim 2 further characterized by and including a magnifying lens overlying said member, the optical axis of said lens extending generally through the center of said wider section of reading area so that the reader's eyes are directed thereto.

References Cited in the file of this patent

UNITED STATES PATENTS

| | | |
|---|---|---|
| 1,647,320 | Thomas | Nov. 1, 1927 |
| 2,334,479 | Creager | Nov. 16, 1943 |